(12) United States Patent
Rottländer et al.

(10) Patent No.: US 12,129,908 B2
(45) Date of Patent: Oct. 29, 2024

(54) LOCKING SYSTEM

(71) Applicant: H. Rottländer & A. Seuthe GbR (vertretungsberechtiger Gesellschafter Hendrik Rottländer, Langenberger, STR. 463, 45277), Essen (DE)

(72) Inventors: Hendrik Rottländer, Essen (DE); Adrian Seuthe, Wetter (DE)

(73) Assignee: H. Rottländer & A. Seuthe GbR (vertretungsberechtiger Gesellschafter Hendrik Rottländer, Langenberger, Essen (DE)

( * ) Notice: Subject to any disclaimer, the term of this patent is extended or adjusted under 35 U.S.C. 154(b) by 0 days.

(21) Appl. No.: 17/927,907

(22) PCT Filed: May 25, 2021

(86) PCT No.: PCT/EP2021/063909
§ 371 (c)(1),
(2) Date: Nov. 28, 2022

(87) PCT Pub. No.: WO2021/239733
PCT Pub. Date: Dec. 2, 2021

(65) Prior Publication Data
US 2023/0349400 A1 Nov. 2, 2023

(30) Foreign Application Priority Data

May 26, 2020 (DE) .................... 10 2020 003 133.1
Jan. 4, 2021 (DE) .................... 10 2021 100 029.7

(51) Int. Cl.
*F16F 9/18* (2006.01)
*F15B 15/26* (2006.01)
(Continued)

(52) U.S. Cl.
CPC ............. *F16F 9/185* (2013.01); *F15B 15/26* (2013.01); *F16F 9/3242* (2013.01); *F16F 9/34* (2013.01); *F16F 9/466* (2013.01); *F16F 9/56* (2013.01)

(58) Field of Classification Search
CPC ......... F15B 15/26; F16F 9/185; F16F 9/3242; F16F 9/34; F16F 9/466; F16F 9/56
See application file for complete search history.

(56) References Cited

U.S. PATENT DOCUMENTS 3,415,159 A    12/1968  Hornlein et al.
4,824,081 A *  4/1989   Pauliukonis ............. A47C 3/30
                                                         188/300
(Continued)

FOREIGN PATENT DOCUMENTS

DE          4239681         6/1994

OTHER PUBLICATIONS

Internationaler Recherchenbericht und Schriftlicher Bescheid [International Search Report and Written Opinion] Dated Sep. 23, 2021 From the International Searching Authority Re. Application No. PCT/EP2021/063909 and Its Translation of Search Report Into English. (16 Pages).

*Primary Examiner* — Michael Leslie

(57) ABSTRACT

The invention relates to an continuously variable locking system for a cylinder-piston arrangement having a cylinder, which has a cap and a base, a piston, which is arranged displaceably in the cylinder and has at least one annular piston seal arranged on the outer surface in the circumferential direction, on which piston a piston rod is arranged, which can be pushed at least partially out axially at the cap end of the cylinder, a closing part, which is continuously variable between an open and a closed position, and a fluid disposed in the cylinder. The object of the invention is to develop the locking system such that the system is characterized by a robust and simple construction, is particularly simple to maintain and adapt, while at the same time being highly reliable and precise in operation. To this end the invention proposes that: the cylinder is designed with a double wall having an inner sleeve and an outer sleeve, the piston is disposed in the inner sleeve, a tubular compensating body having seals running respectively in the circumferential direction on its outer and inner surface is displaceably arranged in an annular space between inner sleeve and outer sleeve, the closing part is arranged at the base end of (Continued)

the cylinder and the base end of the inner sleeve can be closed by means of the closing part.

5 Claims, 5 Drawing Sheets

(51) Int. Cl.
*F16F 9/32* (2006.01)
*F16F 9/34* (2006.01)
*F16F 9/46* (2006.01)
*F16F 9/56* (2006.01)

(56) References Cited

U.S. PATENT DOCUMENTS

| | | | | |
|---|---|---|---|---|
| 5,115,723 | A | * | 5/1992 | Wang ...................... A47C 3/30 |
| | | | | 188/300 |
| 5,285,877 | A | * | 2/1994 | Bonenberger .......... B60R 19/32 |
| | | | | 188/266.2 |
| 8,628,100 | B2 | | 1/2014 | Buettner et al. |
| 10,549,803 | B2 | * | 2/2020 | Shipman ................... B62J 1/06 |
| 10,668,968 | B2 | * | 6/2020 | Shipman ................... B62J 1/08 |
| 2018/0355937 | A1 | | 12/2018 | Tao |

* cited by examiner

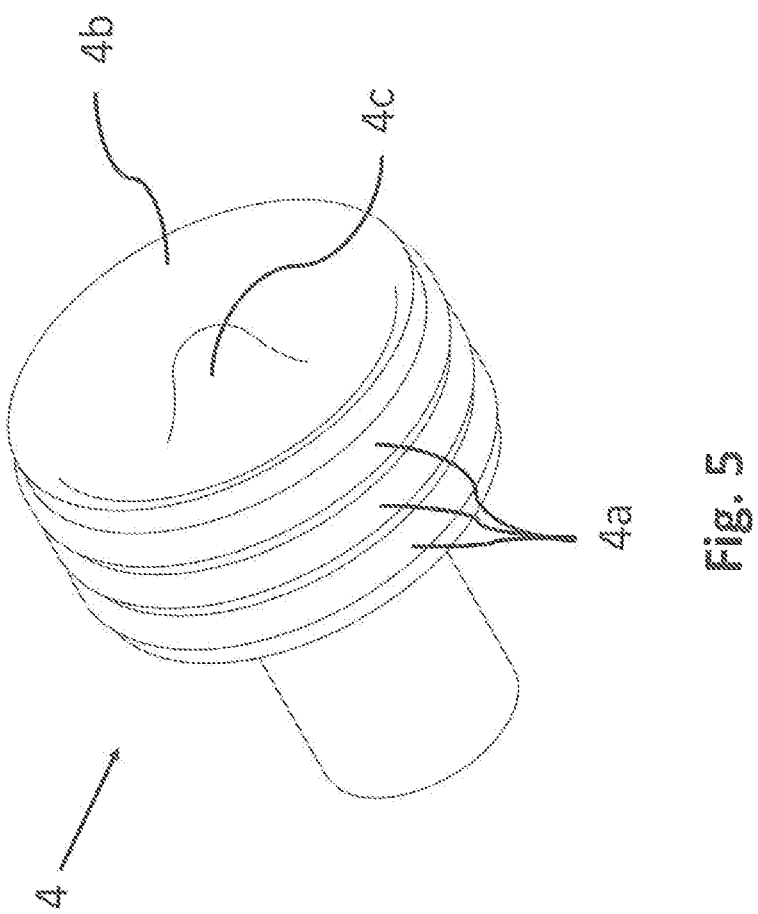

LOCKING SYSTEM

RELATED APPLICATIONS

This application is a National Phase of PCT Patent Application No. PCT/EP2021/063909 having International filing date of May 25, 2021, which claims the benefit of priority of Germany Patent Application Nos. 10 2021 100 029.7 filed on Jan. 4, 2021 and 10 2020 003 133.1 filed on May 26, 2020. The contents of the above applications are all incorporated by reference as if fully set forth herein in their entirety.

FIELD AND BACKGROUND OF THE INVENTION

The invention relates to an continuously variable locking system for a cylinder-piston arrangement having a cylinder, which has a cap and a base, a piston, which is arranged displaceably in the cylinder and has at least one annular piston seal on its outer surface in the circumferential direction, on which piston a piston rod is arranged, which can be pushed at least partially out axially at the cap end of the cylinder, a closing part, which is continuously variable between an open and a closed position, and a fluid disposed in the cylinder.

A locking system of this kind is known from DE 42 39 681 A1, for example. The locking system disclosed there is intended to be used for the stepless damping and fixing of car doors. The closing part is formed there in multiple parts and arranged in the piston. When the locking system there is locked, two opposing flow openings are closed by means of the two closing parts and a duckbill valve in each case in that the closing parts are pressed by a spring against the flow openings. If an axial compressive or tensile force is now exerted on the piston rod, one of the two closing parts opens accordingly when the spring force is overcome. The pressure in the interior of the piston increases correspondingly until the duckbill valve opens and the flow of the fluid through the piston body is thus enabled. The piston rod can thus be displaced into the desired position. As soon as force is no longer exerted on the piston rod, the flow openings are closed again automatically by the reset force of the spring.

Application areas of such locking systems, in addition to car doors, are machine maintenance covers in workshops, fire doors and assembly aids for furniture, for example.

The known locking system is relatively complex and inflexible in construction. The arrangement of the multipart closing mechanism in the piston is laborious and only serviced with a very high outlay as well as only being adaptable with very great effort. In particular, the arrangement of the duckbill valves consisting of an elastomer in the piston is very complex.

SUMMARY OF THE INVENTION

The object of the invention is therefore to develop known, continuously variable locking systems to the effect that these are characterized by a robust and simple construction, are maintained and adapted in a particularly simple manner and at the same time are highly reliable and precise in operation.

To this end the invention proposes, starting out from a locking system of the type stated at the beginning, that the cylinder is formed with a double wall having an inner sleeve and an outer sleeve, the piston is disposed in the inner sleeve, a tubular compensating body having a seal running in the circumferential direction on its inner and outer surface respectively is displaceably arranged in an annular space between inner sleeve and outer sleeve, the adjustable closing part is arranged at the base end of the cylinder and the base end of the inner sleeve can be closed by means of the closing part.

Due to the formation according to the invention of the locking system, an inner and an outer fluid chamber are formed, which are separable by the closing part and in which the fluid is located. The outer fluid chamber is a tubular, annular space between inner sleeve and outer sleeve, which is delimited on the base side by the closing body and on the cap side by the compensating body. The inner fluid chamber corresponds to the cylindrical space in the inner sleeve, which is delimited likewise on the base side by the closing part and on the cap side by the piston.

The closing part can open, delimit and close the connection between these two fluid chambers. When the closing part is located in the open position, the piston rod can be displaced axially. Depending on the direction of displacement, the fluid flows from one fluid chamber to the other in each case. The narrower the opening is set, the higher the damping of the mobility of the piston rod. When the closing part is in the closed position, the piston rod is locked and cannot be moved.

Depending on the requirement, the adjustment of the closing part can be carried out via a suitable control mechanism, for example in the form of a mechanical lever, a spring, via a hydraulic control or in the form of an electronic control. A preferred embodiment provides that the control mechanism is arranged outside of the cylinder. It is hereby facilitated that the control mechanism and thus a substantial part of the mode of action of the locking system can be adapted to changed requirements at any time.

Another advantageous development of the invention provides that the inner sleeve and the outer sleeve are connected in a form- and/or force-locking manner to one another. A detachable solution of this kind permits particularly simple assembly and unproblematic maintenance of the locking system.

Screw threads corresponding to one another on the inner sleeve and outer sleeve are especially suitable for producing the connection.

It is advantageous, furthermore, if the closing part is formed as a rotationally symmetrical body with regard to the longitudinal axis of the cylinder. Due to the rotational symmetry, a particularly uniform flow of the fluid can be realized between the two fluid chambers.

A particularly preferred geometrical embodiment of the closing part provides that this has an annular projection rising in a radial direction on the outer circumference and a central, conical projection falling away in a radial direction. The flow opening is hereby characterized by particularly suitable fluid mechanics.

A hydraulic oil is preferably used as a fluid.

BRIEF DESCRIPTION OF THE SEVERAL VIEWS OF THE DRAWINGS

The invention is explained in greater detail below with the aid of the drawings. In these:

FIG. 5: shows the closing part of the locking system from FIG. 1 schematically in a 3D view.

DESCRIPTION OF SPECIFIC EMBODIMENTS OF THE INVENTION

Figure 1:
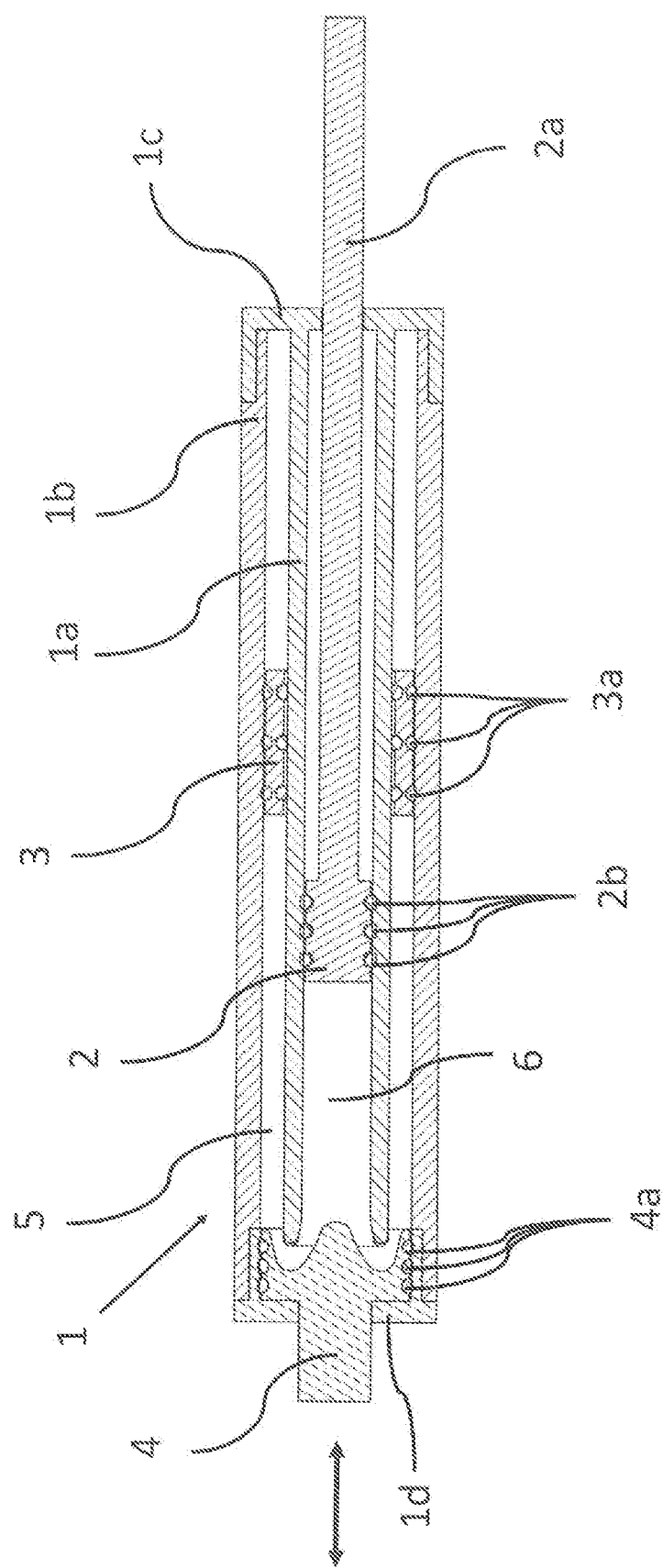
FIG. 1: shows schematically a cross section through a locking system according to the invention in a dynamic state in an exemplary embodiment.

In FIG. 1, a cylinder of a locking system according to the invention is designated by the reference character 1. The cylinder 1 is designed with a double wall and has accordingly an inner sleeve 1a, an outer sleeve 1b, a cap 1c and a base 1d. A piston 2 with a piston rod 2a is arranged in the inner sleeve 1a. According to the invention, the piston and the piston rod can also have the same diameter, unlike in this exemplary embodiment. The piston rod 2a protrudes from the cap end of the cylinder 1 and is displaceable axially out of the cylinder 1. Furthermore, the piston 2 has circumferential annular piston seals 2b on its outer circumference. Arranged in the annular space between outer sleeve 1b and inner sleeve 1a is a compensating body 3 in the form of a hollow cylinder. The compensating body 3 has seals 3a on its inner surface and its outer surface. Furthermore, an axially displaceable closing part 4 is arranged at the base end of the cylinder 1. The closing part 4 has circumferential seals 4a on its outer sides. The adjustment of the closing part 4 is realized via a suitable control, which is not depicted here. The control can be formed, for example, as a mechanical lever or spring, but a hydraulic or electronic control is also possible.

The inner sleeve 1a and the outer sleeve 1b have corresponding threads at the cap end. The inner sleeve 1a can thus be screwed onto the outer sleeve 1b.

The locking system according to the invention thus has two fluid chambers, namely an outer fluid chamber 5, which is delimited by the inner wall of the outer sleeve 1b and by the outer wall of the inner sleeve 1a as well as by the closing part 4 and the compensating body 3, and an inner cylindrical fluid chamber 6, which is defined by the interior of the inner sleeve 1a as well as by the piston 2 and the closing part 4. When the closing part 4 is located in the open position, as shown in FIG. 1, the fluid can flow from the outer fluid chamber 5 into the inner fluid chamber 6 and vice versa.

Figure 2:
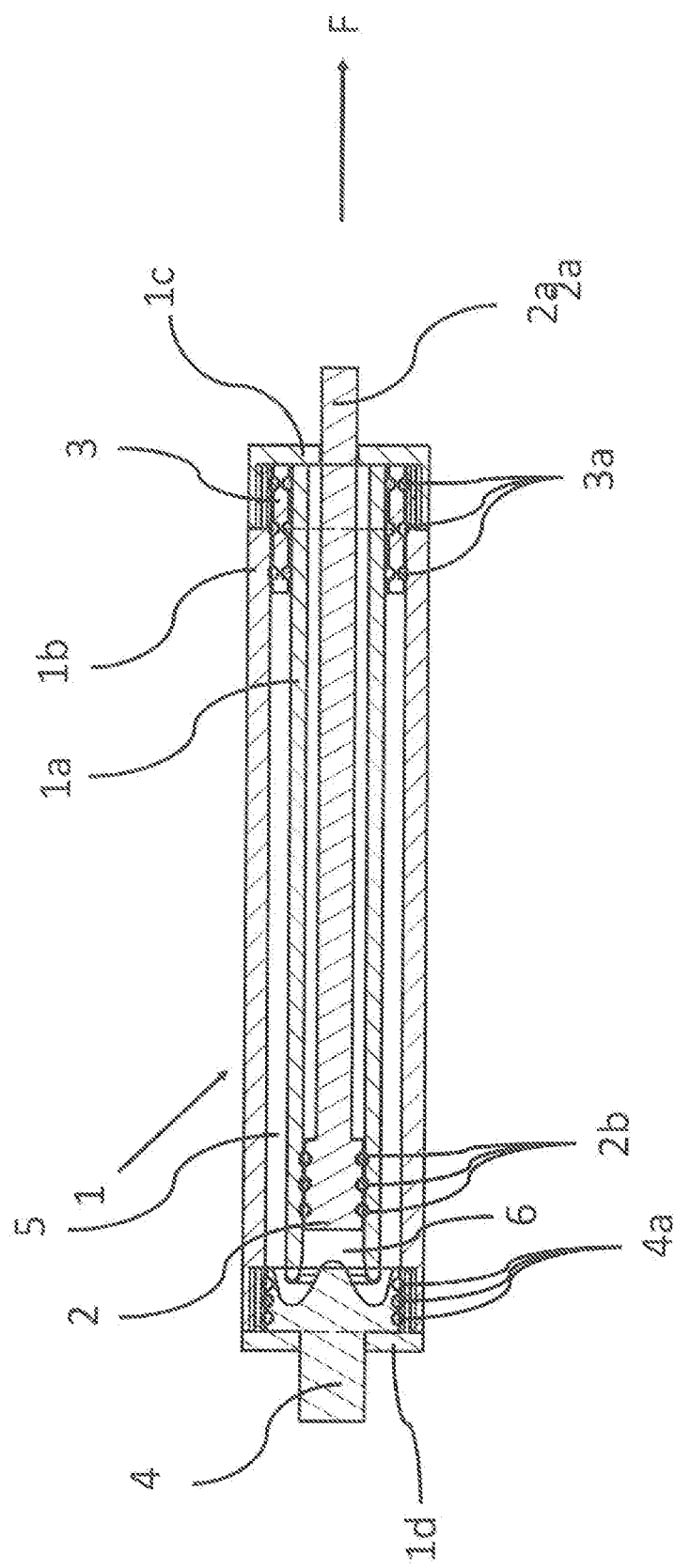
FIGS. 2, 3 and 4: show schematically the adjustment and locking of the piston rod in the exemplary embodiment according to FIG. 1.
Figure 3:
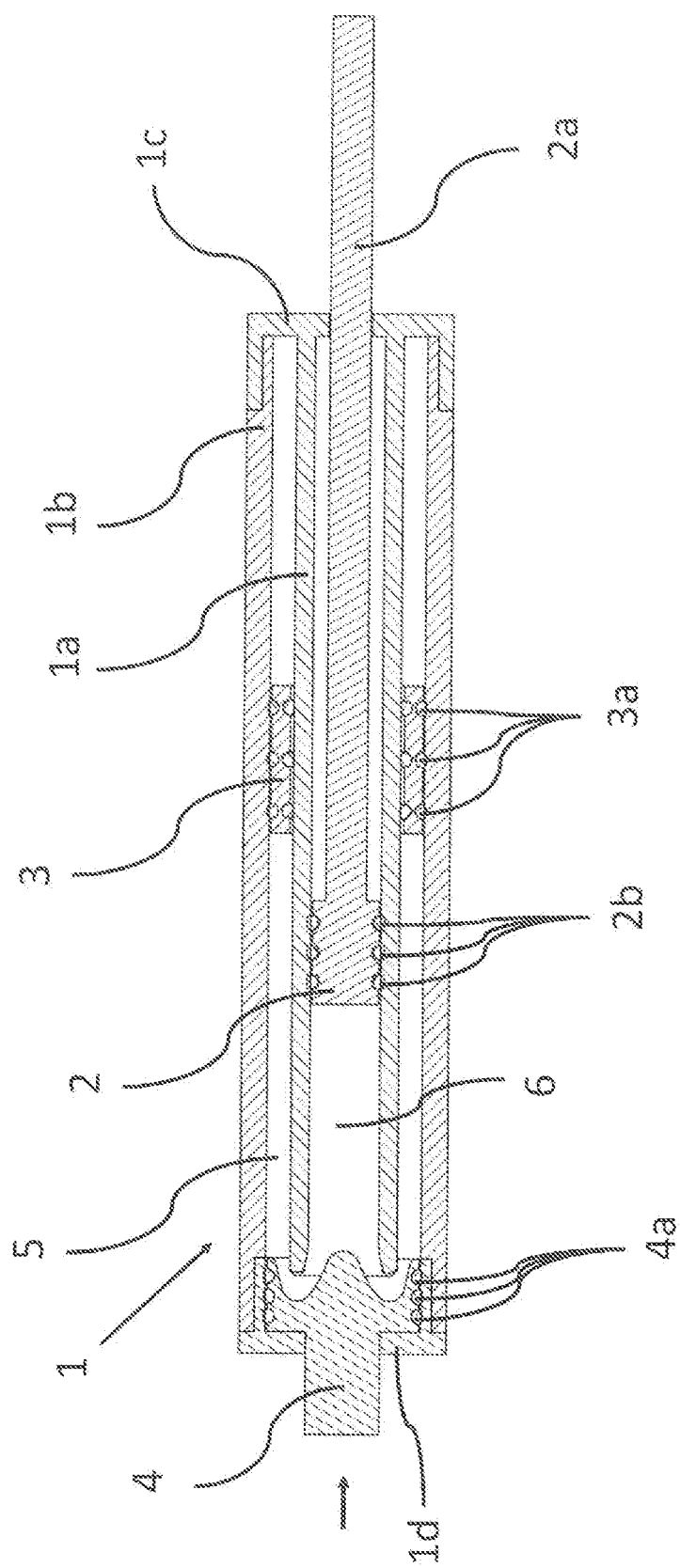
Figure 4:
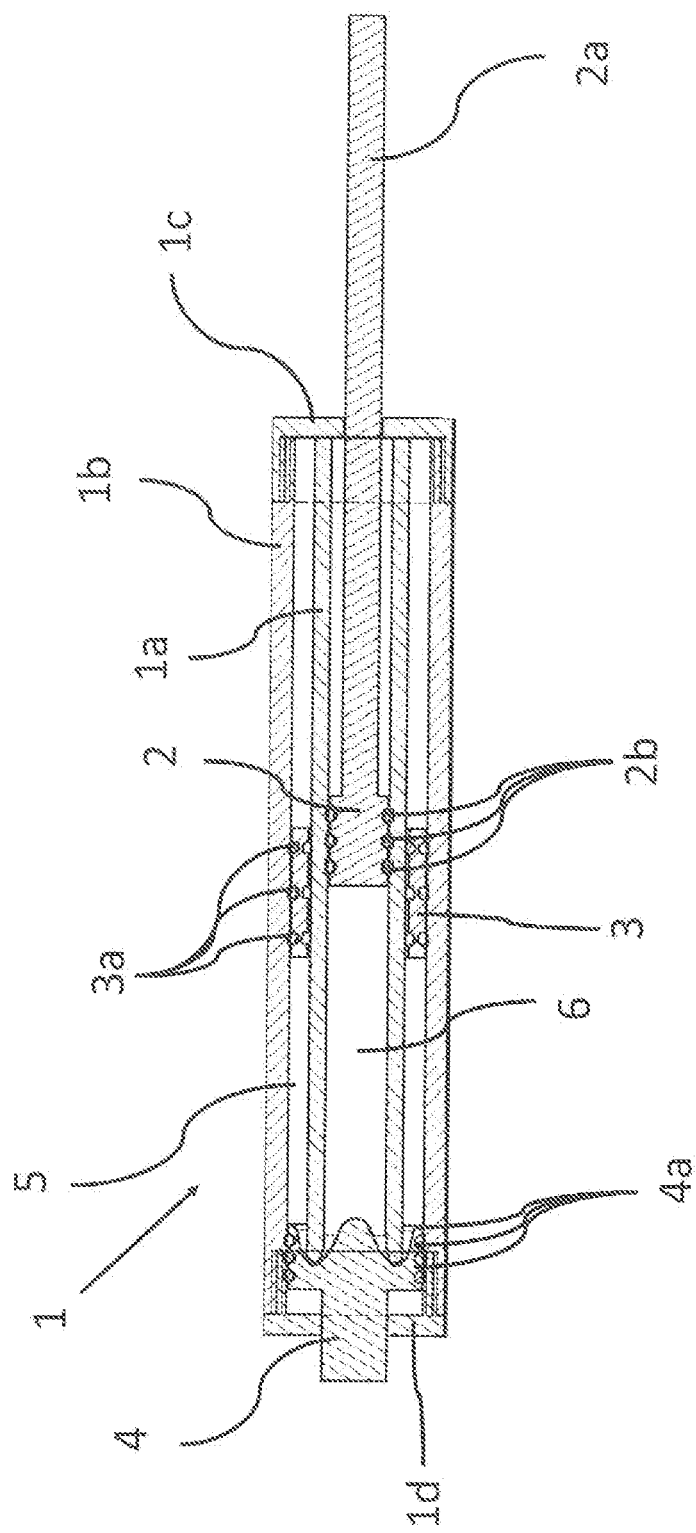

The function of the locking system according to the invention is described in greater detail below with the aid of FIGS. 2, 3 and 4. In FIG. 2, the piston rod 2 is retracted far in. The inner fluid chamber 6 has only a very small volume, therefore. The compensating body 3 is located at the cap end of the cylinder 1, so that the volume of the outer fluid chamber 5 is maximal. The closing part 4 is in the open position. This means that the fluid can flow back and forth between the fluid chambers 5, 6. If a tensile force F is now exerted on the piston rod 2a, the piston 2 is displaced in the direction of the cap end of the cylinder 1, as depicted in FIG. 2. The fluid flows from the outer fluid chamber 5 into the inner fluid chamber 6. The compensating body 3 is displaced in the direction of the base end of the cylinder 1. The volume of the outer fluid chamber 5 diminishes accordingly and the volume of the inner fluid chamber 6 increases to the same extent. The sum of the two volumes remains the same. The region between compensating body 3 and cap 1c fills with air. To this end the screw connection between inner sleeve 1a and outer sleeve 1b is executed to be permeable to air. It is also possible, however, to provide specifically suitable openings on the cap 1c for this purpose.

As soon as the piston rod 2a is in the desired position, the closing part 4 can be guided by means of the control into the closed position, so that no further fluid can flow between the two fluid chambers 5, 6. This system state is depicted in FIG. 4. The piston rod 2a can accordingly no longer be moved. The locking system according to the invention is in a static state. The holding force in the event of tensile loading suffices here up to the evaporation pressure of the fluid.

Control of the closing part 4 can be implemented via an active control command. It is also possible, however, to realize control in a resetting manner, for example via a reset spring. In this embodiment, the closing part 4 is held in the closed position in the normal state by the reset force of the spring. If the reset force is overcome by compressive loading of the piston rod, the closing part opens. If the piston 2 is to be moved in the direction of the cap 1c, the closing part 4 must be opened via the active control command described.

FIG. 5 shows a 3D view of the closing part 4. The closing part 4 has an annular projection 4b rising steeply in the radial direction on its outer circumference and a conical, central projection 4c that is rounded at the tip. Due to this shaping, the closing part 4 corresponds in an optimal manner to the base end of the inner sleeve 1a. If the closing part 4 is displaced between the open position and closed position, a uniform flow gap is formed with extremely uniform flow properties. By precise adjustment of the closing part 4, a desired damping of the mobility of the piston rod 2a can thus also be set. Due to the shaping, the intensity of damping progresses virtually linearly depending on the gap width or respectively the position of the closing part. The damping can also be influenced by the viscosity of the fluid used.

The locking system according to the invention is characterized as a whole by a very simple and low-cost construction. It is fitted easily and independently of the installation location and operates extremely precisely.

REFERENCE CHARACTER LIST

1 Cylinder
1a Inner sleeve
1b Outer sleeve
1c Cap
1d Base
2 Piston
2a Piston rod
2b Piston seal
3 Compensating body
3a Seal
4 Closing part
4a Seal
4b Annular projection
4c Conical projection
5 Outer fluid chamber
6 Inner fluid chamber

The invention claimed is:

1. A continuously variable locking system for a cylinder-piston arrangement having a cylinder, which comprises a cap and a base, a piston, which is arranged displaceably in the cylinder and comprises at least one annular piston seal on its outer surface in the circumferential direction, on which piston a piston rod is arranged, which can be pushed at least partially out axially at the cap end of the cylinder, a closing part, which is continuously variable between an open and a closed position, and a fluid disposed in the cylinder, wherein the cylinder is formed with a double wall having an inner sleeve and an outer sleeve, the piston is disposed in the inner sleeve, a tubular compensating body having seals running in the circumferential direction on its outer and inner surface is displaceably arranged in an annular space between inner sleeve and outer sleeve, the closing part is arranged at the base end of the cylinder and the base end of the inner sleeve can be closed by means of the closing part, wherein the closing part has an annular projection increasing in the axial direction on the outer circumference and a conical central projection, wherein an annular projection and a central projection of the closing part pointing in the direction of the inner sleeve, so that a sealable flow gap is formed between the closure part and the inner sleeve, the width of which depends on the position of the closing part.

2. The continuously variable locking system according to claim 1, wherein the inner sleeve and the outer sleeve are connected detachably in a form- or force-locking manner to one another.

3. The continuously variable locking system according to claim 2, wherein the inner sleeve and the outer sleeve can be connected to one another by means of corresponding screw threads.

4. The continuously variable locking system according to claim 1, wherein the closing part is formed as a rotationally symmetrical body with regard to the longitudinal axis of the cylinder.

5. The continuously variable locking system according to claim 1, wherein the fluid is a hydraulic oil.

* * * * *